United States Patent [19]
Jans

[11] Patent Number: 5,804,541
[45] Date of Patent: Sep. 8, 1998

[54] FLOOR TREATING COMPOSITION COMPRISING A GLYCINE N,N-DIACETIC ACID

[75] Inventor: Josef Jans, Munchwilen, Switzerland

[73] Assignee: Diversey Lever, Inc., Plymouth, Mich.

[21] Appl. No.: 878,743

[22] Filed: Jun. 19, 1997

[30]    Foreign Application Priority Data

Jun. 19, 1996 [EP]   European Pat. Off. .............. 96201699

[51] Int. Cl.$^6$ ................................ C11D 1/10; C11D 9/00; C11D 3/43; C11D 1/66

[52] U.S. Cl. ......................... 510/214; 510/179; 510/201; 510/202; 510/203; 510/212; 510/217; 510/218; 510/219; 510/220; 510/221; 510/223; 510/238; 510/239; 510/240; 510/243; 510/244; 510/245; 510/247; 510/362; 510/405; 510/434; 510/435; 510/437; 510/471; 510/481

[58] Field of Search ...................... 510/214, 179, 510/201, 202, 203, 212, 217, 218, 219, 220, 221, 223, 238, 239, 240, 243, 244, 245, 247, 362, 405, 434, 435, 437, 477, 481

[56]          References Cited

U.S. PATENT DOCUMENTS

| | | | |
|---|---|---|---|
| 3,709,825 | 1/1973 | Chirash et al. ......................... | 252/158 |
| 3,969,257 | 7/1976 | Murray .................................... | 252/102 |
| 5,051,212 | 9/1991 | Culshaw et al. ........................ | 252/546 |
| 5,145,597 | 9/1992 | Rodriguez et al. . | |
| 5,191,002 | 3/1993 | Davis . | |
| 5,254,290 | 10/1993 | Blandiaux et al. ...................... | 252/545 |
| 5,481,018 | 1/1996 | Athey et al. ............................. | 558/442 |
| 5,507,978 | 4/1996 | Honda . | |
| 5,719,111 | 2/1998 | Van Der Brom et al. ............. | 510/224 |

FOREIGN PATENT DOCUMENTS

| | | |
|---|---|---|
| 2162122 | 12/1994 | Canada . |
| 353 388 | 7/1990 | European Pat. Off. . |
| 511 091 | 10/1992 | European Pat. Off. . |
| 43 19 935 | 12/1994 | Germany . |
| 6248206 | 9/1994 | Japan . |
| 94/29421 | 12/1994 | WIPO . |

OTHER PUBLICATIONS

International Search Report dated Jul. 24, 1997.
European Search Report dated Nov. 14, 1996.
*Chemicke Zvesti* – vol. 28, No. 3, 1974, pp. 332–335 (E. Riecanska et al.)–no translation.

*Primary Examiner*—Douglas J. McGinty
*Assistant Examiner*—Charles Boyer
*Attorney, Agent, or Firm*—A. Kate Huffman

[57]          ABSTRACT

A floor stripper composition is provided, having a pH-value above 9.0, and comprising a soap, water and a glycine-N,N-diacetic acid compound, which is preferably methylglycine diacetic acid (MGDA). The diacetic acid is desirably in the form of a divalent metal complex thereof. A process is also provided for removing a zinc containing acrylate polymer film from a floor surface, wherein a floor stripper composition of the invention is applied. A good floor stripper performance could be obtained with this composition owing to its low foaming behaviour.

11 Claims, No Drawings

FLOOR TREATING COMPOSITION COMPRISING A GLYCINE N,N-DIACETIC ACID

FIELD OF THE INVENTION

The present invention relates to a composition for treating floor surfaces, particularly floor surfaces consisting of a polymer film. The invention also relates to a process for removing a polymer film from a floor surface, wherein the composition of the invention is used.

BACKGROUND OF THE INVENTION

Floor cleaning processes are well-known in the art. Some floor surfaces additionally need protection in order to facilitate the cleaning thereof, to avoid or diminish wear, and for aesthetical reasons. Such protection can be obtained by applying to said floor surfaces soap-based products, wax-based products or polymer-based products. Polymer-based products which generally offer the best protection, are usually polymer dispersions comprising polymer, wax, alkaline soluble resin, plasticizer and water.

Polymer dispersions are applied onto a floor surface in the form of a thin polymer film, for instance a thin acrylate polymer film. This type of film is usually hard, transparent and resistant to wear. However, even durable polymer films are susceptible to attrition. Therefore, several products are commercially available for the maintenance of floor polymer films, the main constituent of said maintenance product being generally wax. When maintaining the floor polymer film, said wax is polished onto the surface thereof using a floor polishing machine. However, wear of the polymer film is not significantly reduced by applying this method, and replacement of the polymer film will be needed after a certain period of use.

At present, replacement of polymer films is generally carried out using a floor stripper formulation containing a solvent such as a glycolether or a diglycolether, and an amine as a sequestering agent. Said constituents are present in the stripper formulation in order to facilitate the penetration thereof into the polymer film.

In floor polymer films containing acrylate polymer material, the carboxylate groups of said polymer are either usually cross-linked with zinc ions or protonated, i.e. the acidic form is rather hydrophobic. To overcome this problem, the mentioned solvent is present in the stripper formulation. Furthermore, the amine sequestrant is applied in order to form a stable complex with the zinc ions in the polymer film so as to break down the three-dimensional polymer film structure such that the polymer can be easily removed with mechanical action.

After application of the stripper formulation on the acrylate polymer surface, it is generally collected using a vacuum cleaner. For this reason, the stripper formulation should be non- or at most low-foaming, and so an antifoam agent needs to be present.

In spite of the presence of such antifoam agent, the foaming behaviour of stripper formulations of the prior art often leaves to be desired. In addition, the known stripper formulations are often not sufficiently biodegradable, particularly when these formulations contain ethylene diamine tetraacetate (EDTA) as complexing agent and/or hardly biodegradable antifoaming detergent materials.

It has now been surprisingly found that these and other problems relating to the floor stripper formulation of the prior art can be overcome by applying a glycine-N,N-diacetic acid, preferably methylglycine diacetic acid (MGDA), as a zinc sequestrant, in said formulation.

It has been found that said diacetic acid is very suitable for removal of zinc containing acrylate polymer films. Furthermore, said diacetic acid, particularly MGDA, may have a beneficial effect on the foaming behaviour of the stripper formulation in which it is present, particularly when it is complexed with divalent metal ions.

DEFINITION OF THE INVENTION

Accordingly, in a first aspect the present invention provides a floor stripper composition having a pH-value above 9.0, and comprising a soap, water and a glycine-N,N-diacetic acid of the formula (I):

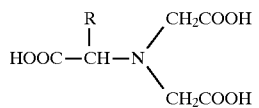

wherein R is a $C_1$–$C_{20}$ alkyl group or $C_2$–$C_{20}$ alkenyl group.

Preferably said stripper composition has a pH-value above 10.5, a pH-value above 12.0 being most preferred. Furthermore, said composition is desirably in the liquid state.

In a second aspect, the invention provides a process for removing zinc containing acrylate polymer films from floor surfaces, wherein a floor stripper composition according to the invention.

DETAILED DESCRIPTION OF THE INVENTION

As mentioned above, the glycine-N,N-diacetic acid used as a zinc sequestrant in the floor stripper composition according to the present invention is preferably methylglycine diacetic acid (MGDA).

The floor stripper composition of the invention preferably contains the diacetic acid in the form of a divalent metal complex thereof whereby the divalent metal is not zinc. When this composition is applied to a zinc containing polymer film, there will generally result an exchange of metal ions in the divalent metal complex (from divalent metal to zinc), since the stability constant of the zinc-complex is usually larger than that of divalent metal-complex. As a consequence of this exchange, the diacetic acid of the invention favourably influences the polymer removal performance of the stripper composition.

The divalent metal complex used in the preferred stripper formulation according to the invention, desirably contains calcium or magnesium as divalent metals.

Several well-known complexing agents, such as nitrilotriacetate (NTA) and gluconates, are known to lose their capability to keep calcium ions in solution, at very high pH-values; when using these complexing agent, formation of calcium hydroxide results at pH-values above 12. It is, therefore, unexpected that, owing to the presence of the diacetic acid of the present invention, the calcium ions are stabilized in the solution, even at pH-values in excess of pH=12.0.

As a result of this property of the diacetic acid, the stripper composition of the invention retains its anti-foaming characteristics at any hardness of the water used for diluting the composition to use concentration.

For obtaining a favourable use concentration of the constituents, the stripper composition of the invention is preferably diluted with water by at least a factor 2, before it is applied to the polymer film to be removed.

The divalent metal complex of the diacetic acid is preferably present in the composition of the invention at a level of 0.5 –6% by weight, more preferably 0.5–3% by weight.

The soap present in the composition of the invention is preferably selected from the group consisting of sodium and potassium cocosoap ($C_{12}$–$C_{18}$ fatty acid, sodium or potassium salt). Said soap constituent is preferably present in the composition of the invention at a level of 0.1–1% by weight.

Preferably, the stripper composition of the invention further comprises a solvent. Said solvent is preferably selected from the group consisting of glycolethers, diglycolethers and mixtures thereof. Particularly suitable solvents are butylglycolether, ethylglycolether, butyldiglycolether, and propylene glycolether. Other suitable solvents are phenylglycolether and benzyl alcohol.

The level of said solvent in the composition of the invention is preferably in the range of 3–20% by weight.

Preferably the stripper composition of the invention also comprises an amine compound. Said amine is preferably selected from the group consisting of ammonia, monoethanolamine, diethanolamine, triethanolamine, ethylenediamine and mixtures thereof. The level of said amine in the composition of the invention is preferably in the range of 0.2–15% by weight.

In order to further diminish the risk of any foaming behaviour, the composition of the invention preferably additionally comprises 0.1–3% by weight of a low-foaming nonionic surfactant material. Preferred nonionic surfactants are ($C_6$–$C_{20}$) phenol-ethylene oxide condensates, the condensation products of linear or branched aliphatic $C_8$–$C_{20}$ primary or secondary alcohols with ethylene oxide and propylene oxide groups, capped condensation products of linear or branched aliphatic $C_8$–$C_{20}$ primary or secondary alcohols with ethylene oxide and propylene oxide groups, and products made by condensation of ethylene oxide with the reaction products of propylene oxide and ethylene diamine.

The floor stripping process

The process of the invention is a floor stripping process aimed at removing a zinc-containing acrylate polymer film from a floor surface, such that said polymer film can be replaced by a new polymer film. Said stripping process is generally carried out using a floor treating machine including one round pad and a water tank, containing the stripper composition of the invention diluted with water.

The floor treating machine is either further equipped with a suction head through which the stripper composition is removed from the floor surface treated therewith or the stripper solution is separately collected by a wet vacuum drier after treatment of the floor surface.

The invention is illustrated by the following non-limiting Examples, in which parts and percentages are by weight unless otherwise stated.

EXAMPLE 1

Comparative Example A

Aqueous floor stripper compositions were formulated, having compositions within the ranges shown below, by mixing the ingredients concerned and diluting the mixture obtained with water:

| Example no. | 1 (%) | A (%) |
| --- | --- | --- |
| Monoethanolamine | 6–10 | 6–10 |
| Butyldiglycol | 3–8 | 3–8 |
| Sodium hydroxide (50%) | 3–4 | 3–4 |
| Sodium cocosoap | 0.1–1 | 0.1–1 |
| EDTA | — | 1–3 |
| MGDA | 1–3 | — |
| Minor ingredients | 1–1.5 | 1–1.5 |
| Water (demineralised) | 73–86 | 73–86 |

The minor ingredients preferably include nonionic detergent material and a perfume. In addition, the minor ingredients in the formulation of Example 1, desirably include a small amount of a divalent metal salt. In that case, a divalent metal complex of MGDA will be formed in situ, as a result of the presence of the MGDA and the divalent metal salt.

The above shown stripper formulations were applied for removing a Zn containing acrylate polymer film from a floor surface, by using a floor treating machine including one round and a water tank, containing either the formulation according to the present invention of Example 1 or the prior art formulation of Example A. A wet vacuum drier was used for collecting the liquid formulation after treatment of the floor surface.

First the formulation of the invention was used for removing said floor polymer film from a specific floor surface area. Subsequently, an equal area of floor polymer film was removed, by applying the prior art formulation.

It was found that a significant time saving of about 10% could be obtained when applying the formulation of the invention, as compared to the time needed using the prior art formulation.

The main reason for the more effective stripper performance of the formulation of the invention is considered to be its low foaming characteristic, resulting in better mechanical action onto the floor surface and quicker collection of the stripper liquid by the wet vacuum drier.

I claim:

1. A floor stripper composition having a pH-value above 9.0, and comprising a soap a solvent selected from the group consisting of glycol ethers and diglycol ethers, water and a glycine-N,N-diacetic acid compound of the formula (I):

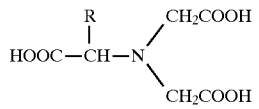

wherein R is a $C_1$–$C_{20}$ alkyl group wherein the glycine-N, N-diacetic acid is present in the form of a divalent metal complex thereof, whereby the divalent metal is not zink or $C_2$–$C_{20}$ alkenyl group.

2. Composition according to claim 1, wherein the glycine-N,N-diacetic acid compound is methylglycine diacetic acid.

3. Composition according to claim 1, wherein said composition has a pH-value above 10.5.

4. Composition according to claim 1, wherein the divalent metal complex is present at a level of from 0.5–6% by weight.

5. Composition according to claim 1, wherein the soap is present at a level of 0.01–1% by weight.

6. Composition according to claim 1, wherein the solvent is present at a level of from 3–20% by weight.

7. Composition according to claim 1, wherein the composition further comprises an amine compound.

8. Composition according to claim 7, wherein the amine is selected from the group consisting of ammonia, monoethanolamine, diethanolamine, triethanolamine, ethylene diamine, and mixtures thereof.

9. Composition according to claim 7, wherein the amine is present at a level of from 0.2–15% by weight.

10. Composition according to claim 1, wherein said composition further comprises 0.1–3% by weight of a low-foaming nonionic surfactant.

11. Process for removing a zinc containing acrylate polymer film from a floor surface, wherein a floor stripper composition according to claim 1 is applied.

* * * * *